(12) United States Patent
Erlacher et al.

(10) Patent No.: US 12,735,113 B2
(45) Date of Patent: Sep. 15, 2026

(54) MOTOR VEHICLE COMPONENT COMPRISING TWO PROFILES

(71) Applicant: MAGNA STEYR Fahrzeugtechnik GmbH & Co KG, Graz (AT)

(72) Inventors: Manuel Erlacher, Radenthein (AT); Thomas Mokina, Seiersberg (AT); Olga Sulcová, Graz (AT)

(73) Assignee: MAGNA STEYR Fahrzeugtechnik Gmbh & Co KG, Graz (AT)

(*) Notice: Subject to any disclaimer, the term of this patent is extended or adjusted under 35 U.S.C. 154(b) by 394 days.

(21) Appl. No.: 18/509,888

(22) Filed: Nov. 15, 2023

(65) Prior Publication Data

US 2024/0166264 A1 May 23, 2024

(30) Foreign Application Priority Data

Nov. 21, 2022 (DE) ......................... 102022212400.6

(51) Int. Cl.
*B62D 25/02* (2006.01)
*B62D 27/02* (2006.01)

(52) U.S. Cl.
CPC ......... *B62D 25/025* (2013.01); *B62D 27/026* (2013.01)

(58) Field of Classification Search
CPC ........................... B62D 25/025; B62D 27/026; B62D 25/2036; B62D 25/04; B62D 27/023; B62D 25/02; B62D 29/005
USPC .......................................................... 296/209
See application file for complete search history.

(56) References Cited

U.S. PATENT DOCUMENTS

| | | | | |
|---|---|---|---|---|
| 9,045,175 | B2 * | 6/2015 | Mori | B62D 25/2036 |
| 10,407,106 | B2 * | 9/2019 | Hofer | B62D 25/025 |

FOREIGN PATENT DOCUMENTS

| | | | | | |
|---|---|---|---|---|---|
| DE | 4022444 | A1 | | 1/1992 | |
| DE | 102013113869 | A1 | | 6/2015 | |
| DE | 102018127368 | A1 | | 5/2020 | |
| DE | 102021004896 | A1 | | 9/2022 | |
| EP | 3360761 | A1 | | 8/2018 | |
| WO | WO-2021060660 | A1 | * | 4/2021 | B62D 25/025 |

OTHER PUBLICATIONS

European Patent Office search report for EP23206910.4, mailed Apr. 18, 2024.
German Search Report for application No. DE102022212400.6 mailed Jul. 24, 2023; 3 pages.

* cited by examiner

*Primary Examiner* — Amy R Weisberg
*Assistant Examiner* — Philip C Adams
(74) *Attorney, Agent, or Firm* — Jordan IP Law, LLC; Todd A. Vaughn

(57) ABSTRACT

A motor vehicle component includes a first profile have a first bonding surface with at least one groove, and a second profile have a second bonding surface with at least one groove. The first bonding surface and the second bonding surface are bonded by an adhesive that completely covers the first bonding surface and the second bonding surface in non-grooved regions and does not cover the at least one groove of the first bonding surface and the at least one groove of the second bonding surface.

20 Claims, 3 Drawing Sheets

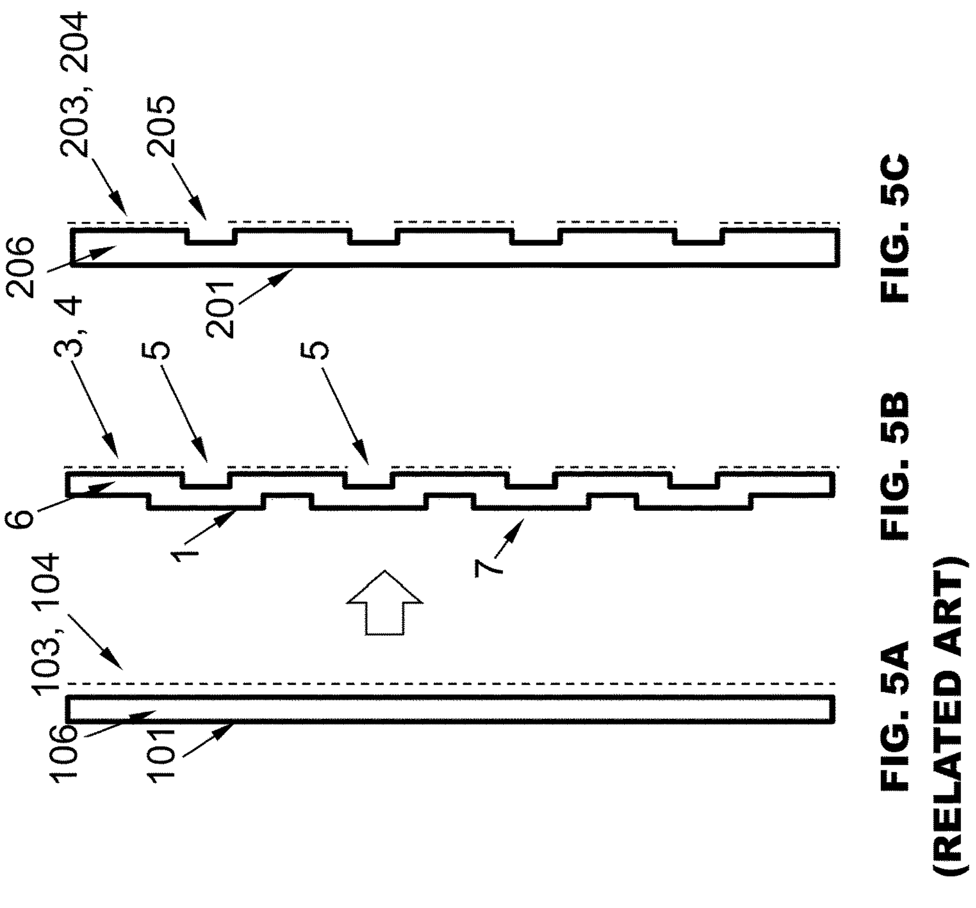
FIG. 5A (RELATED ART)
FIG. 5B
FIG. 5C
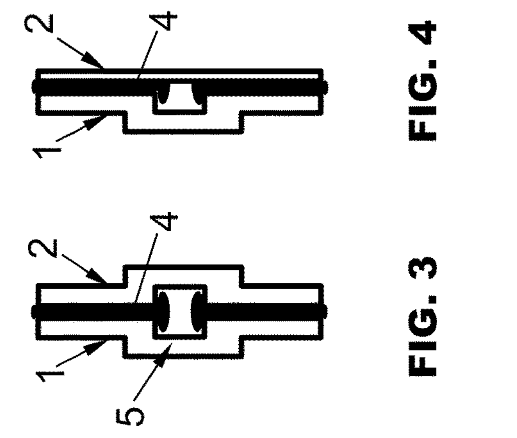
FIG. 3
FIG. 4
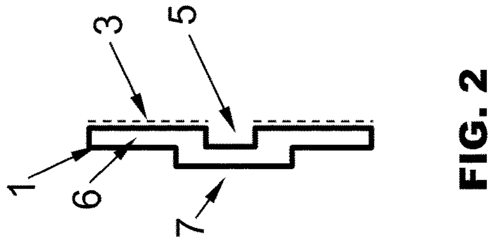
FIG. 2

MOTOR VEHICLE COMPONENT COMPRISING TWO PROFILES

CROSS-REFERENCE TO RELATED APPLICATIONS

The present application claims priority 35 U.S.C. § 119 to German Patent Publication No. DE 102022212400.6 (filed on Nov. 21, 2022), which is hereby incorporated by reference in its entirety.

TECHNICAL FIELD

One or more embodiments of this disclosure relate to a motor vehicle component and a method for producing such a motor vehicle component. The motor vehicle component comprises a sill or a motor vehicle floor having a first profile and a second profile.

BACKGROUND

It is known that some motor vehicle components are composed of multiple, often large profiles. For example, sills of a motor vehicle can be formed of two or more hollow profiles extending in the longitudinal direction of the vehicle. Such profiles can be adhesively bonded together at bonding surfaces over a large area, that is to say, can have large contact surfaces with one another at which they are adhesively bonded together. Such a motor vehicle component can, in particular, be formed as a multi-part sill composed of multiple extruded profiles.

Such large-area adhesive bonds cannot be produced reliably. As a result of non-uniform distribution of the adhesive, regions that are not wetted, for example, due to air inclusions, can be formed. The properties of the adhesive bonds that are formed then do not correspond with the properties that can be determined via a simulation program. The results of a structural durability and crash simulation may thus be better than in reality, the motor vehicle components that are produced actually have poorer durability properties than planned.

FIGS. 1A to 1C illustrate steps of a related art method for producing a motor vehicle component, in order to illustrate the problem of large-area adhesive bonding which is used in such a method.

As illustrated in FIG. 1A, a first profile 1, which here is in the form of a flat component, is first provided on one side on a bonding surface 3 with an adhesive 4. On the left in FIG. 1A, the component is shown from the side, and on the right in FIG. 1A it is shown from the front. In the representation on the right of FIG. 1A, it can be seen that the adhesive 4 is applied in the form of adhesive beads to the bonding surface 3.

As illustrated in FIG. 1B, a second profile 2 is brought up to the first profile 1. FIG. 1C shows on the left, from the side, that the first profile 1 is pressed with the second profile 2. The illustration on the right in FIG. 1C shows a section A-A, according to the illustration on the left of FIG. 1C. The adhesive 4 is thus shown after pressing has been carried out. As a result of pressing of the two components 1, 2 until a defined bonding gap is formed, air inclusions can form between the adhesive beads, such air inclusions being visible in FIG. 1C on the right as white areas within the adhesive 4.

FIG. 5A schematically shows a first profile 101 of a related art motor vehicle component. The first profile 101 comprises a surface 106 having bonding surface 103 to receive an adhesive 104.

SUMMARY

One or more embodiments of this disclosure are to provide a motor vehicle component, in particular, a sill of a motor vehicle, the structural durability and crash behavior of which can better be predetermined.

One or more embodiments of this disclosure are to further provide a simple method for producing such a motor vehicle component, the structural durability and crash behavior of which can better be predetermined.

In accordance with one or more embodiments of this disclosure, a motor vehicle component, in particular, a sill or a motor vehicle floor, comprises: a first profile have a first bonding surface with at least one groove; and a second profile have a second bonding surface with at least one groove, the first bonding surface and the second bonding surface being bonded by an adhesive that completely covers the first bonding surface and the second bonding surface in non-grooved regions and does not cover the at least one groove of the first bonding surface and the at least one groove of the second bonding surface.

Thus, in accordance with the one or more embodiments, at least one of the two bonding surfaces of the profiles to be connected has at least one groove or otherwise an indentation with straight or curved lateral borders, and also with corners or rounded corners at edges thereof. The at least one groove is oriented inwardly in a direction away from the other/opposite bonding surface. When the two bonding surfaces of the profiles are pressed together in order to produce the adhesive bond, an adhesive bond actually forms only in those regions which do not lie in a groove, i.e., an indentation. Because the bonding surfaces, which are formed to be large in size/area, are divided into a plurality of smaller bonding surfaces by the groove(s), the problems which occur in the case of large bonding surfaces, such as air inclusions, are avoided.

In accordance with the one or more embodiments, the bonding surfaces and free spaces between the bonding surfaces are designed such that wetting of the defined actual bonding surfaces, between the grooves, is reproducibly ensured, and structural durability and crash simulations can thus also be portrayed accurately.

In accordance with the one or more embodiments, the overall bonding surface of the first profile and/or the second profile is large, so that adhesive bonding takes place over a large area. Such a large bonding surface preferably extends over at least 20 percent, particularly preferably at least 50 percent, and specifically, at least 70 percent, of the length of a motor vehicle and/or over at least 20 percent, particularly preferably at least 50 percent, and specifically, at least 70 percent, of the height of the motor vehicle component (e.g., the sill or motor vehicle floor). Length and height specifications here relate to an installed position of the motor vehicle component in a motor vehicle and the vehicle coordinates, that is to say the length and height dimension of the motor vehicle (x-direction and z-direction).

In accordance with the one or more embodiments, the bonding surface, apart from the grooves, is planar. Preferably, the groove or the grooves also have a base which is planar and which is particularly preferably parallel to the bonding surface. The bonding surface can be a boundary surface of a surface, i.e., a flat part of the profile.

In those regions in which a groove has been formed, the bonding surface is not covered by the adhesive. Preferably, there is substantially no adhesive in a groove. In particular at the edges of a groove, however, there may be excess adhesive which does not contribute substantially towards the adhesive bonding of the two profiles. In any case, adhesive bonding of the two profiles takes place in the intermediate regions, in which a groove has not been formed, and not in the regions of the bonding surface in which a groove has been formed. Via the adhesive bond, the two profiles are joined together. A further fastening means for joining the two profiles, such as, for example, screwing or punch riveting, is preferably not provided but may be advantageous for quicker handling of the joined components on installation.

In accordance with the one or more embodiments, the first bonding surface of the first profile and/or the second bonding surface of the second profile has at least two grooves, preferably more than two grooves. In such an embodiment, the adhesive covers the bonding surface completely in those regions in which a groove has not been formed and does not cover the bonding surface in those regions in which a groove has been formed. Preferably, all the grooves of the first profile and/or all the grooves of the second profile are oriented parallel to one another.

In accordance with the one or more embodiments, the height (in the z-direction of the vehicle) of a single groove can be, for example, approximately equal to the height of the intermediate region of the bonding surface between two grooves which is used for the adhesive bonding, or between 1 and 90 percent of the height of that intermediate region, preferably between 5 and 70 percent, particularly preferably between 10 and 60 percent. The height of a groove in the vehicle z-direction can be, for example, 0.2-10 cm, preferably 0.5-5 cm. The depth of a groove can be, for example, 1-10 mm, preferably 2-7 mm.

In accordance with the one or more embodiments, the groove(s) preferably extend in a longitudinal direction of the motor vehicle component (e.g., the sill or motor vehicle floor).

In accordance with the one or more embodiments, the first bonding surface of the first profile and the second bonding surface of the second profile have at least two grooves, preferably more than two grooves. In such an embodiment, the grooves of the first profile are each arranged opposite the grooves of the second profile. Thus, the intermediate regions which form the adhesive bonds of the bonding surface are also arranged opposite one another.

In accordance with the one or more embodiments, the grooves of the first bonding surface of the first profile and/or the grooves of the second bonding surface of the second profile each represent a U-shape of a surface of the profile that forms the respective bonding surface, so that, on the side opposite the bonding surface, in the region of a groove, the surface has in each case an elevation away from the bonding surface.

In accordance with the one or more embodiments, the first profile and/or the second profile is produced by a continuous production process, in particular, by extrusion.

In accordance with the one or more embodiments, the first profile and/or the second profile is a hollow profile.

In accordance with the one or more embodiments, a method for producing a motor vehicle component as described comprises: providing the first profile and the second profile separately from one another, with the first bonding surface of the first profile and/or the second bonding surface of the second profile having at least one groove, preferably a plurality of grooves; applying an adhesive to the first bonding surface of the first profile and/or to the second bonding surface of the second profile; pressing the first profile and the second profile together in a manner such that the adhesive completely covers the first bonding surface of the first profile and the second bonding surface of the second profile in non-grooved regions and does not cover the bonding surface in those grooved regions.

When the two profiles are pressed together, they can be adhesively bonded to one another and thus joined. The groove(s) preferably extend in the longitudinal direction of the motor vehicle component (e.g., the sill or motor vehicle floor). The adhesive is in the form of adhesive beads, which can preferably likewise be applied to the first bonding surface of the first profile and/or to the second bonding surface of the second profile in the longitudinal direction of the motor vehicle component, particularly preferably in each case to the intermediate regions of the bonding surface in which a groove has not been formed. The groove(s) are at least for the most part not covered with adhesive, so that adhesive bonding does not occur in the grooves, that is to say in the indentations. The grooves can be produced, for example, during extrusion, by shaping or by milling.

DRAWINGS

One or more embodiments of the disclosure will be illustrated by way of example in the drawings and explained in the description hereinbelow.

FIG. 2 illustrates schematic representation of a profile for a motor vehicle component, in accordance with one or more embodiments.

FIG. 3 illustrates a schematic representation of a motor vehicle component, in accordance with one or more embodiments.

FIG. 4 illustrates a schematic representation of another motor vehicle component, in accordance with one or more embodiments.

FIG. 5A illustrates a schematic representation of a related art motor vehicle component.

FIG. 5B illustrates a schematic representation of a motor vehicle component, in accordance with a first embodiment.

FIG. 5C illustrates a schematic representation of a motor vehicle component, in accordance with a second embodiment.

DESCRIPTION

Figures 1A, 1B, 1C:
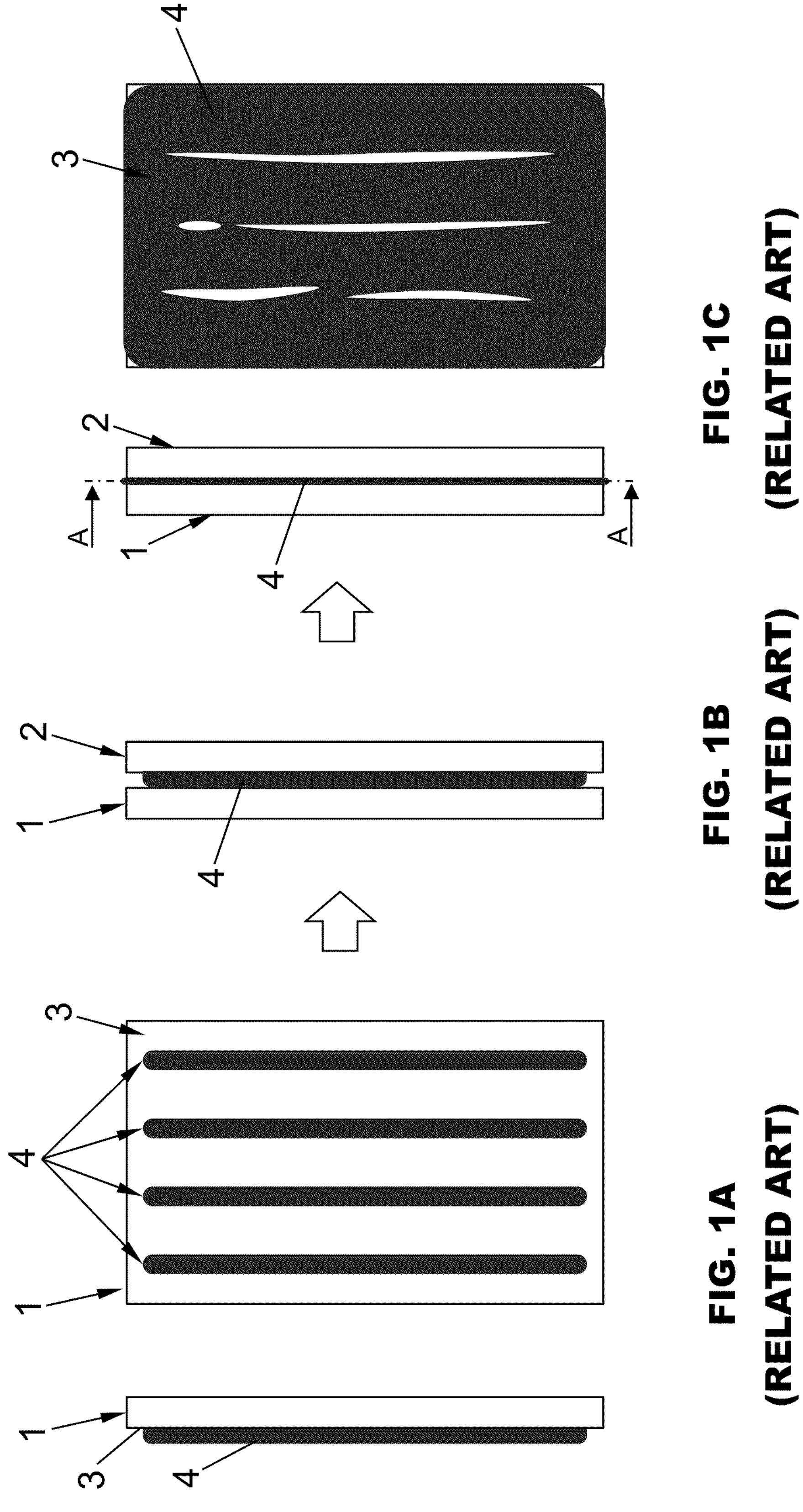
FIGS. 1A to 1C illustrate schematic representations of a related art method of producing a motor vehicle component.

FIG. 2 is a schematic representation of a basic first profile 1 for a motor vehicle component, in accordance with one or more embodiments. The first profile 1 is in the form of a flat metal sheet. The first profile 1, therefore, comprises a surface 6. A top surface of the surface 6 forms a first bonding surface 3. On this side of the surface 6 there is an inwardly facing groove 5 in the surface 6, and thus, in the first bonding surface 3. The groove 5 has been formed by shaping or pressing the surface 6 in a U-shape, so that an elevation 7 is formed on the opposite side of the surface 6. The first bonding surface 3 can be covered with adhesive 4.

FIGS. 3 and 4 show the first profile of FIG. 2 in a state in which the first profile 1 has been adhesively bonded to a second profile 2. The second profile 2 likewise has a groove 5 which is opposite the groove 5 of the first profile 1 (FIG. 3), or the second profile 2 can also be flat, for example, in the form of a flat metal sheet (FIG. 4). In each case, the groove 5 of the first profile 1 and optionally the groove 5 of the second profile 2 is not covered with adhesive 4, the remaining portions of the bonding surfaces being covered with the adhesive 4.

FIGS. 5A to 5C schematically show a comparison of the related art first profile 11 (FIG. 5A) with first profiles 1, 201 (FIGS. 5B and 5C) in accordance with the one or more embodiments. In a vertical direction of a motor vehicle in which the first profile 1, 201 is to be installed, the first profile 1, 201 has a plurality of grooves 5, 205 formed by pressing or shaping of the surface 6, 206 of the first profile 1, 201. In the gaps between the grooves 5, 205 there is adhesive 4, 204 on the bonding surface 3, 203. On the side of the surface 6, 206 opposite the grooves 5, 205, the surface 6, 206 has elevations 7, 207 (FIG. 5B) or is flat/planar (FIG. 5C).

Figure 6:
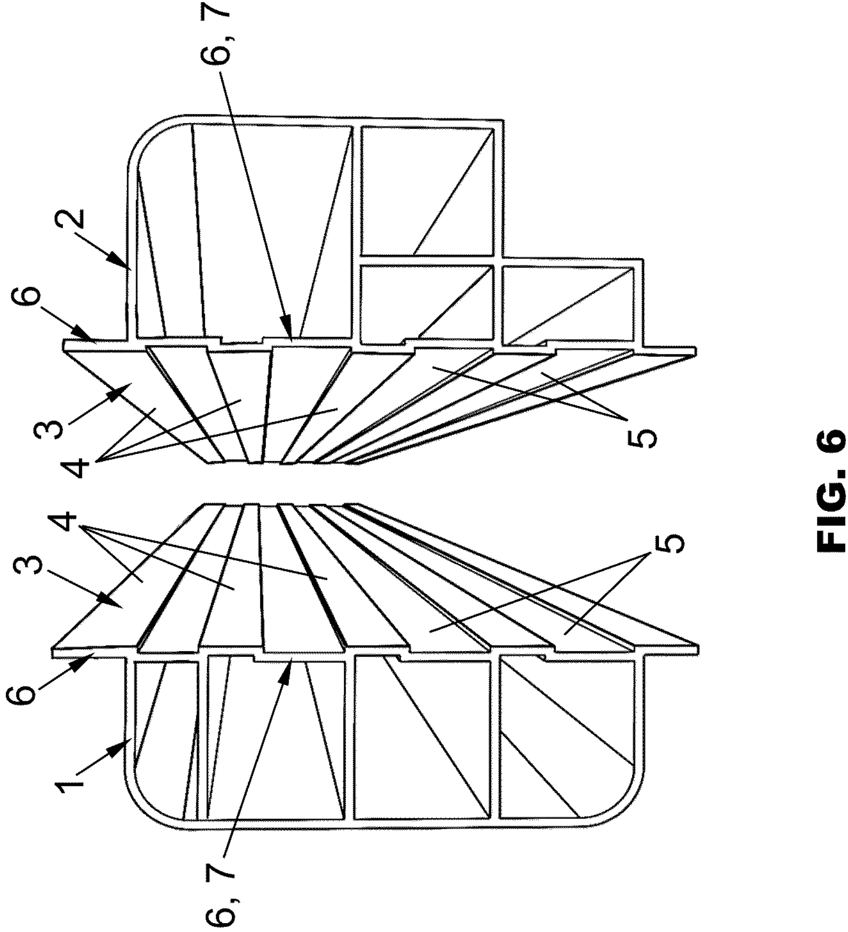
FIG. 6 illustrates a perspective view of another motor vehicle component comprising a motor vehicle sill, in accordance with one or more embodiments.

FIG. 6 is a perspective view of another motor vehicle component (e.g., the sill or motor vehicle floor) in accordance with the one or more embodiments. The first profile 1 is a hollow profile which forms an outer side of the sill, and the second profile 2 is likewise a hollow profile and forms an inner side of the vehicle sill. The first profile 1 and the second profile 2 are in the form of extruded profiles. The first profile 1 and the second profile 2 each have a bonding surface 3. The first profile 1 and the second profile 2 can be adhesively bonded together at the bonding surfaces 3 by an adhesive 4. The bonding surface 3 of the first profile 1 and the bonding surface 3 of the second profile 2 have a plurality of grooves 5 extending horizontally. The adhesive 4 covers the bonding surface 3 completely in the non-grooved regions, and at least substantially does not cover or does not cover at all the bonding surface in the grooved regions (i.e., where groove 5 is formed). Adhesive bonding between the first profile 1 and the second profile 2 thus takes place only in the intermediate regions of the bonding surface 3 in which grooves 5 have not been formed.

The grooves 5 of the first profile 1 and the grooves 5 of the second profile 2 are oriented parallel to one another and in each case lie opposite one another. The grooves 5 of the bonding surfaces 3 of the first profile 1 and the second profile 2 are in each case formed as a U-shaped shaping of a surface 6 of the hollow profile 1, 2 in question. This surface 6 thus has on the side opposite the bonding surface 3, in the region of the grooves 5, elevations 7 which face away from the bonding surface 3.

The terms "coupled," "attached," or "connected" may be used herein to refer to any type of relationship, direct or indirect, between the components in question, and may apply to electrical, mechanical, fluid, thermal, optical, electromagnetic, electromechanical, or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A motor vehicle sill, comprising:

a first profile forming an outer side of the sill and having a first bonding surface with at least one groove having a depth of 1-10 mm;

a second profile forming an inner side of the sill and having a second bonding surface with at least one groove having a depth of 1-10 mm; and an adhesive bond to establish a direct connection of the first bonding surface and the second bonding surface at non-grooved regions of the first bonding surface and the second bonding surface, wherein the adhesive bond is applied in a manner that covers the first bonding surface and the second bonding surface in the non-grooved regions and does not cover the at least one groove of the first bonding surface and the at least one groove of the second bonding surface.

2. The motor vehicle sill of claim 1, wherein the at least one groove of the first bonding surface are each arranged opposite the at least one groove of the second bonding surface.

3. The motor vehicle sill of claim 1, wherein the at least one groove of the first bonding surface is formed having a U-shape in a manner such that on a surface opposite to the first bonding surface in a region of the at least one groove, the surface has an elevation oriented away from the first bonding surface.

4. The motor vehicle sill of claim 3, wherein the at least one groove of the second bonding surface is formed having a U-shape in a manner such that on a surface opposite to the second bonding surface in a region of the at least one groove, the surface has an elevation oriented away from the second bonding surface.

5. The motor vehicle sill of claim 1, wherein:

the first profile comprises an extruded first profile, and the second profile comprises an extruded second profile.

6. A motor vehicle sill, comprising:

a first profile forming an outer side of the sill and having a first bonding surface with a plurality of grooves; and a second profile forming an inner side of the sill and having a second bonding surface with a plurality of grooves; and an adhesive bond to establish a direct connection of the first bonding surface and the second bonding surface at a profile interface defined by non-grooved regions of the first bonding surface and the second bonding surface, wherein the adhesive bond is applied in a manner that covers the first bonding surface and the second bonding surface in the non-grooved regions and does not cover the grooves of the first bonding surface and the grooves of the second bonding surface.

7. The motor vehicle sill of claim 6, wherein the grooves of the first bonding surface are oriented parallel to one another.

8. The motor vehicle sill of claim 6, wherein the grooves of the second bonding surface are oriented parallel to one another.

9. The motor vehicle sill of claim 6, wherein the grooves of the first bonding surface are each arranged opposite the grooves of the second bonding surface.

10. The motor vehicle sill of claim 6, wherein the grooves of the first bonding surface are formed having a U-shape in a manner such that on a surface opposite to the first bonding surface in a region of the grooves, the surface has an elevation oriented away from the first bonding surface.

11. The motor vehicle sill of claim 6, wherein the grooves of the second bonding surface are formed having a U-shape in a manner such that on a surface opposite to the second bonding surface in a region of the grooves, the surface has an elevation oriented away from the second bonding surface.

12. The motor vehicle sill of claim 6, wherein:

the first profile comprises an extruded first profile, and the second profile comprises an extruded second profile.

13. A method for manufacturing a motor vehicle sill, the method comprising:

forming, via a continuous extrusion process, a first profile forming an outer side of the sill and having a first bonding surface with at least one groove, and a second profile forming an inner side of the sill and having a second bonding surface with at least one groove;

applying an adhesive to non-grooved regions of the first bonding surface of the first profile and/or to non-grooved regions of the second bonding surface of the second profile;

forming an adhesive bond to establish a direct connection at the non-grooved regions of the first bonding surface and the second bonding surface by pressing the first profile and the second profile together so that the adhesive completely covers the first bonding surface of the first profile in the non-grooved regions and does not cover the first bonding surface in the grooved regions, and also completely covers the second bonding surface of the second profile in the non-grooved regions and does not cover the second bonding surface in the grooved regions.

14. The method of claim 13, further comprising arranging the at least one groove of the first bonding surface opposite the at least one groove of the second bonding surface.

15. The method of claim 13, wherein the at least one groove of the first bonding surface is formed having a U-shape in a manner such that on a surface opposite to the first bonding surface in a region of the at least one groove, the surface has an elevation oriented away from the first bonding surface.

16. The method of claim 13, wherein the at least one groove of the second bonding surface is formed having a U-shape in a manner such that on a surface opposite to the second bonding surface in a region of the at least one groove, the surface has an elevation oriented away from the second bonding surface.

17. The motor vehicle sill of claim 1, wherein:

the first profile comprises a hollow profile; and the second profile comprises a hollow profile.

18. The motor vehicle sill of claim 6, wherein:

the first profile comprises a hollow profile, and the second profile comprises a hollow profile.

19. The motor vehicle sill of claim 6, wherein:

the at least one groove of the first bonding surface has a depth of 1-10 mm, and the at least one groove of the second bonding surface has a depth of 1-10 mm.

20. The method of claim 13, wherein:

the first profile comprises a hollow profile, and the second profile comprises a hollow profile.

* * * * *